United States Patent
Jaeschke et al.

(10) Patent No.: US 8,591,693 B2
(45) Date of Patent: Nov. 26, 2013

(54) METHOD FOR JOINING COMPONENTS

(75) Inventors: Peter Jaeschke, Handeloh (DE); Dirk Herzog, Hannover (DE); Manuel Kern, Hannover (DE); Holger Purol, Selsingen (DE); Christian Peters, Bremen (DE)

(73) Assignee: LZH Laserzentrum Hannover e.V., Hannover (DE)

( * ) Notice: Subject to any disclaimer, the term of this patent is extended or adjusted under 35 U.S.C. 154(b) by 0 days.

(21) Appl. No.: 13/320,049

(22) PCT Filed: May 12, 2010

(86) PCT No.: PCT/EP2010/002932
§ 371 (c)(1),
(2), (4) Date: Feb. 16, 2012

(87) PCT Pub. No.: WO2010/130438
PCT Pub. Date: Nov. 18, 2010

(65) Prior Publication Data
US 2012/0132354 A1    May 31, 2012

(30) Foreign Application Priority Data
May 14, 2009   (DE) .......................... 10 2009 021 373

(51) Int. Cl.
*B32B 37/06* (2006.01)
*B32B 37/14* (2006.01)

(52) U.S. Cl.
USPC ...................................................... 156/272.8

(58) Field of Classification Search
USPC .......................................... 156/272.2, 272.8
See application file for complete search history.

(56) References Cited

U.S. PATENT DOCUMENTS

| | | |
|---|---|---|
| 2002/0100540 A1* | 8/2002 | Savitski et al. ............... 156/157 |
| 2003/0130381 A1* | 7/2003 | Joachimi et al. ................ 524/88 |
| 2007/0044907 A1* | 3/2007 | Hatase et al. .............. 156/272.8 |

FOREIGN PATENT DOCUMENTS

| | | |
|---|---|---|
| DE | 103 03 534 | 8/2004 |
| DE | 10 2005 025 825 | 5/2007 |
| DE | 60 2004 007 624 | 4/2008 |
| DE | 10 2007 003 357 | 7/2008 |
| DE | 10 2007 020 389 | 11/2008 |
| EP | 1 939 254 | 7/2008 |

(Continued)

OTHER PUBLICATIONS

Laserstrahlschweißen Kohlenstofffaser-verstärkter Kunststoffe-Prozesssicheres Fügen ohne Zusatzwerkstoffe. XP009137866. Ingenieurspiegel. 1. 2010.

(Continued)

*Primary Examiner* — Daniel McNally
(74) *Attorney, Agent, or Firm* — Whitham Curtis Christofferson & Cook, PC

(57) ABSTRACT

The invention relates to a method for joining components (4, 6) made at least partially of thermoplastic material and of which at least one is reinforced with long fibers, wherein the components (4, 6) are welded to each other in a joint zone. The components (4, 6) are thereby welded in the joint zone (8) by means of heat input generated by laser radiation (10), wherein at least one (4) of the components (4, 6) is at least partially transparent to the laser radiation (10) and wherein the laser radiation (10) is at least partially absorbed by at least one (6) of the components (4, 6). According to the invention, the laser radiation (10) is absorbed essentially in fibers and/or in a fiber coating of the component reinforced with long fibers.

12 Claims, 5 Drawing Sheets

(56) References Cited

FOREIGN PATENT DOCUMENTS

Figure 1:
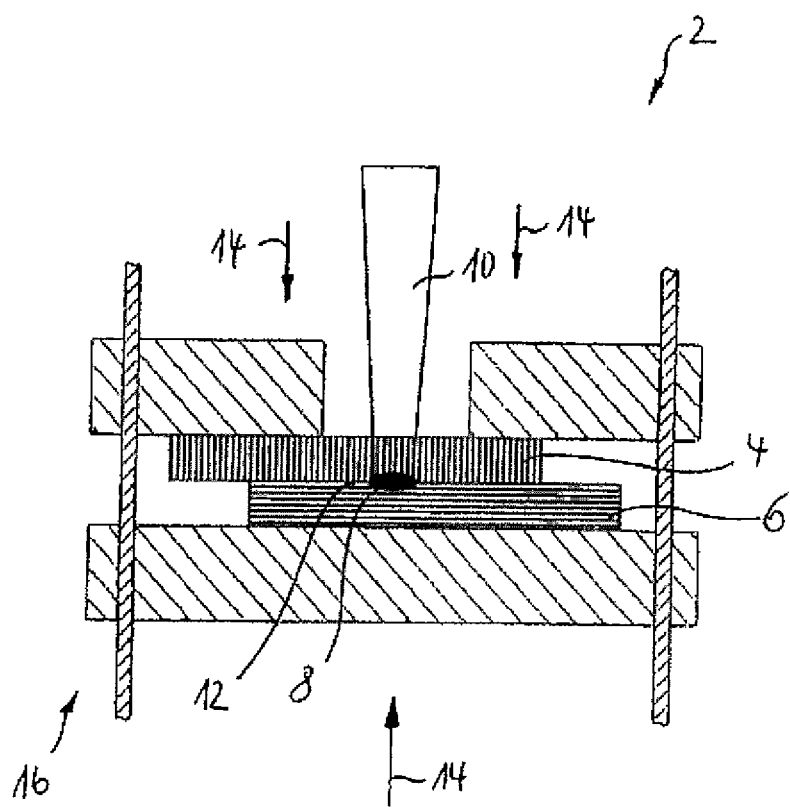

| JP | 59-174315 | | 10/1984 |
|---|---|---|---|
| JP | 62044429 A | * | 2/1987 |
| JP | 2001-355313 | | 12/2001 |
| JP | 2008-75077 | | 4/2008 |
| JP | 2008-230224 | | 10/2008 |

OTHER PUBLICATIONS

Yousefpour, A., et al., "Fusion Bonding/Welding of Thermoplastic Composites," Journal of Thermoplastic Composite Materials. vol. 17, Jul. 2001. pp. 303-341.

Grewell, D., et al., "Relationship between Optical Properties and Optimized Processing Parameters for Through-Transmission Laser Welding of Thermoplastics," Journal of Reinforced Plastics and Composites. XP007901665. 2004. pp. 239-247.

Rosselli, F., et al., "Effects of processing on laser assisted thermoplastic tape consolidation," Composites Part A 28A 1997. 1023-1033.

Jaschke., P., et al., "Laser transmission welding of thermoplastic composites—Fundamental investigations into the influence of the carbon fibre reinforcement and orientation on the weld formation," Joining Plastics. pp. 247-255, Date: Apr. 2009.

* cited by examiner

METHOD FOR JOINING COMPONENTS

The invention relates to a method, of the type mentioned in the preamble of claim 1, for joining components which are composed at least partially of thermoplastic material and at least one of which is long fiber-reinforced.

Lightweight structures have become popular in many sectors and serve, for example in traffic engineering, for markedly reducing the energy demand against the background of constantly rising energy costs and continuously falling energy reserves. To that effect, not only are light metals used for lightweight structures, but also plastics which contribute to considerable reductions in terms of weight or of cost.

Against the background of the reduction in weight, it is necessary to be able to ensure the desired component safeties or component strengths. Composite fiber materials, which can be carbon-, aramide-, natural fiber- or glass fiber-reinforced plastics, have therefore proved the most appropriate for this purpose, since, in addition to low density, they also have high specific strength and rigidity.

Fiber-reinforced plastics are joined together by means of various positive, nonpositive or materially integral joining methods, particularly adhesive bonding techniques being in widespread use for joining corresponding components. However, the critical disadvantage of using adhesives is that the required adhesion cannot be tested nondestructively, and therefore additional screw or rivet connections are employed so that the connection of components can be ensured. Furthermore, some types of CFRPs cannot be glued to one another.

Methods for joining components which are composed at least partially of thermoplastic material and at least one of which is long-fiber reinforced are known, for example, from DE 10 2007 003 357 A1, DE 10 2007 020 389 A1 and JP 2001 355 313 A.

DE 10 2007 003 357 A1 discloses a method for joining components, in which the components are welded to one another in a joining zone. The publication discloses the use of friction welding, induction welding and heated tool welding methods for joining the components.

Long fiber-reinforced plastics are generally characterized in that the fibers used for reinforcement have at least a length of 1 to at least 25 mm. According to the invention, long fiber-reinforced components are also understood to mean continuous fiber-reinforced components. In this case, the long fibers may also be combined, for example, with short fibers, the length of which is usually less than 1 mm. To reinforce the plastic, the long fibers can be fed into a press directly from a plasticizer extruder.

The known method has proved to have the disadvantage that the joining of components is comparatively complicated and time-intensive.

Methods using laser radiation for joining components composed of thermoplastic material are known from DE 103 03 534 A1 and DE 10 2005 052 825 A1.

DE 60 2004 007 624 T2 discloses a method of the respective type for joining components which are composed at least partially of thermoplastic material and at least one of which is long fiber-reinforced. In the known method, the components are welded to one another in a joining zone, the components being welded together by heat being introduced into the joining zone by laser radiation, at least one of the components being at least partially transparent to the laser radiation, and the laser radiation being at least partially absorbed by at least one of the components.

The object on which the invention is based is to simplify the execution of the known method.

This object is achieved by means of the invention specified in claim 1.

According to the invention, the laser radiation is absorbed essentially on fibers and/or a fiber coating of the long fiber-reinforced component. For example, and in particular, according to the invention two laser-transparent components which are composed of a thermoplastic material and of which one is carbon fiber-reinforced and the other glass fiber-reinforced can be connected to one another, the absorption necessary for converting the laser light into heat taking place at least predominantly on the commercially available carbon fiber. There is therefore no need additionally for absorbers introduced into the thermoplastic material. Moreover, a special coating of the carbon fibers is unnecessary. The invention is especially advantageous in applications where the carbon fibers are present as long fibers or continuous fibers.

Absorption of the laser radiation "essentially" on fibers and/or a fiber coating of the long fiber-reinforced component is understood according to the invention to mean that absorption takes place at least predominantly, preferably completely or essentially completely on the fibers of the long fiber-reinforced component, for example carbon fibers. In particular, absorption of the laser radiation "essentially" on fibers and/or a fiber coating is understood to mean that the long fiber-reinforced component is free of additional absorber. To absorb the laser radiation, therefore, the component contains, apart from the reinforcing fibers, in particular carbon fibers, no or at least virtually no absorbers additionally added.

One advantage of the method according to the invention is that materials used in any case and having known properties can be joined to one another without any special modification.

A further advantage of the method according to the invention is that the welding of the components can be controlled or regulated very well and can be automated, and it can therefore be used very effectively for series production.

Using the method according to the invention for joining components enables welded joints to be made which have high load-bearing capacity. Furthermore, it is possible to weld a plurality of components to one another simply and quickly.

The material which can be used for a long fiber-reinforced component is, for example, carbon fiber-reinforced plastic (CFRP). Materials which can be used for a component transparent to laser beams are, for example, short fiber-reinforced and/or nonreinforced materials, such as, for example, glass fiber-reinforced plastics (GFRP). However, the component transparent to laser radiation may also be long fiber-reinforced and/or continuous fiber-reinforced, for example with glass fibers or other fibers transparent to the laser radiation.

According to the invention, it is possible to steer the introduction of energy for welding the components together by means of the arrangement of the fibers and the relative position of the laser beam with respect to the fiber or fiber orientation. Absorption of the laser radiation on the fibers results in heating of the material surrounding the fibers, and the components can therefore be connected to one another.

In an advantageous development of the invention, the laser radiation is absorbed on fibers on the surface and/or in the immediate vicinity of the surface of at least one of the components. The surface therefore serves for forming a joining zone, so that, according to the invention, immediate vicinity is understood to mean a region of which the distance from the surface facing the joining zone is smaller than its distance from that surface of the component which faces away from the joining zone. This affords the advantage that the region of the joining zone can be designed to be a different size, with the result that the mechanical load-bearing capacity of the joining zone can be adapted to the requirements demanded in each case. Moreover, higher efficiency is thereby achieved.

In addition, in a further advantageous development of the invention, the laser radiation is absorbed on at least one laser-absorbing layer of at least one of the components. An advantage associated with this relates to a direct introduction of the heat generated, so that, for example, a coating of the component can serve for absorbing the laser radiation on the surface of the component. Furthermore, the layer or layers may also be arranged within the component, so that the laser radiation is absorbed in the volume of the component. Moreover, it is possible to arrange the layer in the component in a directed manner, for example by using fibers which form a corresponding layer in the component.

In a further advantageous development of the invention, at least two long fiber-reinforced components are welded to one another by means of at least one further component at least partially transparent to the laser radiation, in that in each case at least one joining zone is formed in each case between one of the long fiber-reinforced components and the further component. This affords the advantage that two long fiber-reinforced components which at first cannot be welded directly to one another can be welded to one another via an additional component.

According to the invention, "transparent" is also understood to mean the property of partial transparency.

This gives rise, in particular, to the advantage that by the long fiber-reinforced components being welded together in this way the properties of the overall component thereby obtained can be influenced in a directed way.

Long fiber-reinforced components are distinguished, for example, by low deformability which, according to the invention, can be compensated in that a further component which has higher deformability or elasticity is used for welding the long fiber-reinforced components together. Consequently, for example, component stresses can also be broken down, so that deformation of the further component or further components prevents a failure of the long fiber-reinforced components. The operating reliability of the joined components can thus be increased.

According to the invention, a fluid which can be hardened or solidified, for example, by the laser radiation can also be used as a further component. Moreover, the fluid may be designed to be permanently elastic after the welding operation. The fluid may also be volatile, so that it is introduced or applied solely for the welding operation and, in particular, at least partially diminishes as a result of the heat which occurs or due to the effect of the laser radiation during welding.

To ensure good weldability, a development of the invention is characterized in that at least one long fiber-reinforced component is used, the fibers of which are arranged at least partially in a matrix which is composed at least partially of a thermoplastic material or contains a thermoplastic material. In this case, a method according to the invention may be characterized in that the thermoplastic material is a thermoplastic elastomer or contains a thermoplastic elastomer, as provided for by a further advantageous development of the invention. This affords the advantage that it is possible for components to be joined by introducing even only a small amount of energy into the component.

The joining of components may also be achieved, according to the invention, in that at least one of the components has at least one transition zone, within which the transparency of the component to the laser radiation varies spatially, the joining zone being formed along the contact face between the components in a region of higher transparency, and at least one of the components containing laser-transparent fibers, in particular glass fibers. For the joining of components, it is therefore sufficient for one component to have a transition zone which makes it possible to weld components which cannot be welded directly by means of laser radiation, such as for example, laser beam-impermeable components.

Furthermore, it is possible that the transparency of the component to the laser radiation changes gradually in the transition zone, as provided for by another advantageous development of the invention. As a result, the transition zone can be formed, for example, by a variation in the absorber distribution or concentration of the material. According to the invention, the transition zone may also extend over the entire component.

Moreover, in a further expedient development of the invention, at least one of the components is reinforced by carbon fibers and/or glass fibers.

In a further expedient development of the invention, at least one long fiber-reinforced component and one nonreinforced or short fiber-reinforced component are welded to one another.

In another advantageous development of the invention, the components to be welded to one another, during the welding of two components by means of a further component transparent to the laser radiation are carbon fiber-reinforced, and the further component transparent to the laser radiation is glass fiber-reinforced. In this embodiment, a system composed of two carbon fiber-reinforced and of one glass fiber-reinforced component are welded together through the glass fiber-reinforced component.

In the abovementioned embodiment, it is basically possible that each of the carbon fiber-reinforced components is connected intimately to the glass fiber-reinforced component, so that a connection of the carbon fiber-reinforced components is achieved indirectly via the glass fiber-reinforced component. However, to that extent, in an advantageous development of the invention the further component is designed and/or the method parameters are selected such that the components to be welded together are connected intimately to one another. In this embodiment, a direct intimate connection of the components to be welded to one another is achieved.

The invention is explained in more detail below by means of the accompanying drawing in which exemplary embodiments of the use of a method according to the invention for joining components are illustrated. The method according to the invention is illustrated by means of an exemplary device and various exemplary joining points which can be produced, for example, by means of the exemplary device, using a method according to the invention. In this case, all the features claimed, described and illustrated in the drawing form in themselves and in any desired combination with one another the subject of the invention, irrespective of their summary in the patent claims and their back references and also independently of their description or illustration in the drawing.

The figures in the drawing show a selection of examples for carrying out or using a method according to the invention in each case in an illustration with reduced detail for the purpose of a clearer overview of the elements which assist understanding. The illustrations are therefore neither true to scale nor true to detail.

Identical or similar constituents are given the same reference symbols.

Figure 2:
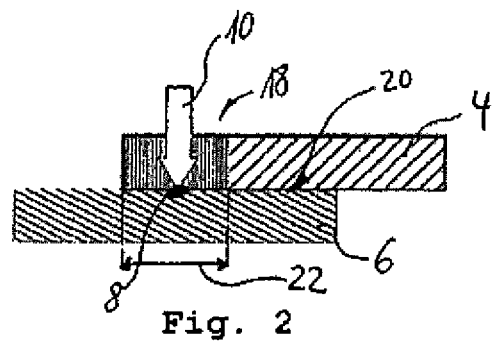
Figure 3:
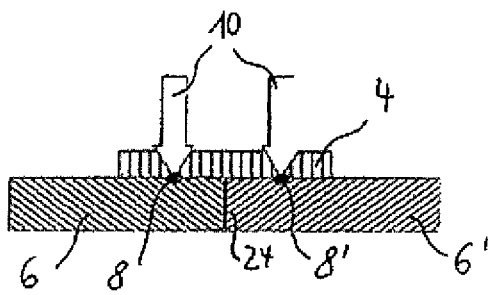
Figure 4:
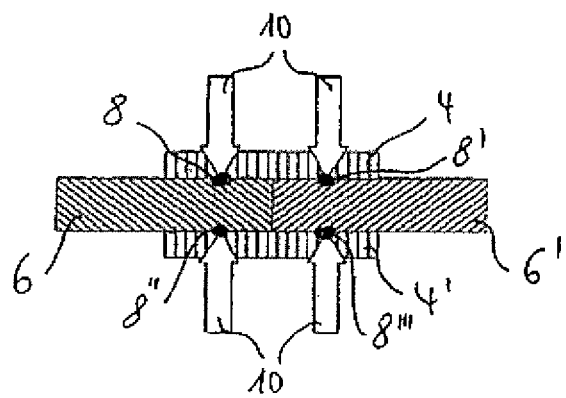
Figure 5:
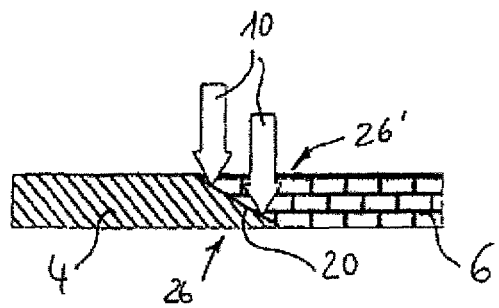
Figure 6:
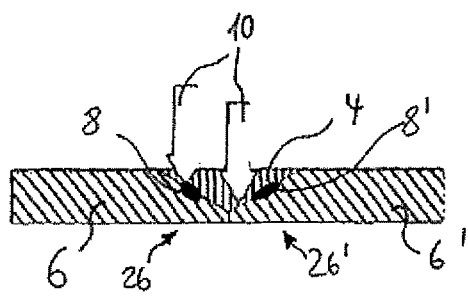
Figure 7:
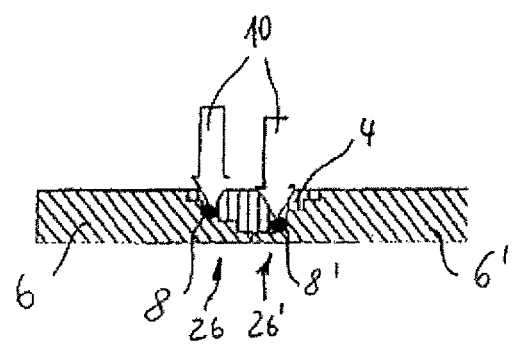
Figure 8:
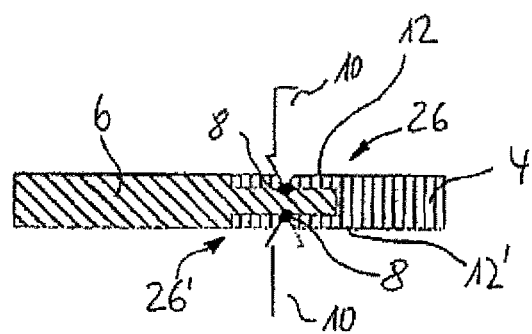
Figure 9:
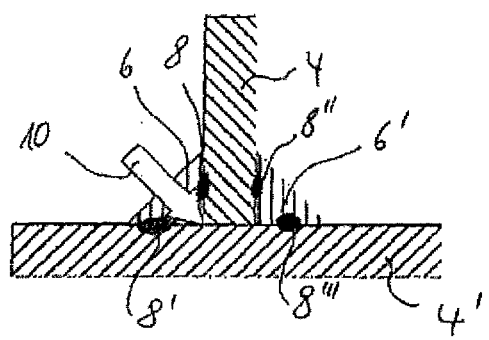
Figure 10:
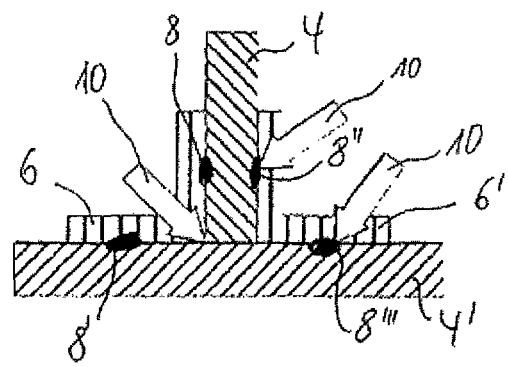
Figure 11:
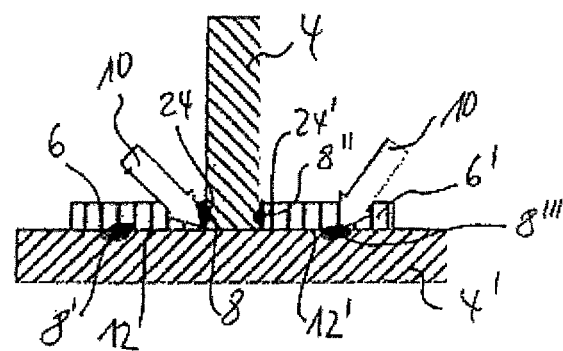

In the drawing:

FIG. 1 shows a highly diagrammatical illustration of an example of a device for carrying out a method according to the invention in a sectional illustration, FIG. 2 shows a first example of the use of a method according to the invention in the same type of illustration as in FIG. 1, FIG. 3 shows a second example of the use of a method according to the invention in the same type of illustration as in FIG. 1, FIG. 4 shows a third example of the use of a method according to the invention in the same type of illustration as in FIG. 1, FIG. 5 shows a fourth example of the use of a method according to the invention in the same type of illustration as in FIG. 1, FIG. 6 shows a fifth exemplary embodiment of a method according to the invention in the same type of illustration as in FIG. 1, FIG. 7 shows a sixth example of the use of a method according to the invention in the same type of illustration as in FIG. 1, FIG. 8 shows a seventh example of the use of a method according to the invention in the same type of illustration as in FIG. 1, FIG. 9 shows an eighth example of the use of a method according to the invention in the same type of illustration as FIG. 1, FIG. 10 shows a ninth example of the use of a method according to the invention in the same type of illustration as FIG. 1, FIG. 11 shows a tenth example of the use of a method according to the invention in the same type of illustration as FIG. 1.

FIG. 1 shows a first exemplary embodiment of a device 2 for carrying out a method according to the invention. In this case, a component 4 is used which is composed of a thermoplastic which is nonreinforced. The component 4 is welded to the component 6, the component 6 being composed of carbon-reinforced plastic. The two components 4, 6 are welded to one another in a joining zone 8, the introduction of heat necessary for this purpose being generated, according to the invention, by laser radiation 10. In this exemplary embodiment, the laser radiation 10 is not focused. Insofar as is necessary, according to the invention work may also be carried out with focused or defocused laser radiation 10. In this case, the component 4 is transparent to the laser radiation 10, and the component 6 absorbs the laser radiation 10 in the region of the joining zone 8 on its surface 12. By the laser radiation 10 being absorbed, the material of the component 6 and the material of the component 4 heat up so that the two components 4, 6 are welded to one another in the joining zone 8.

During the welding process, the two components 4, 6 are acted upon with a joining force 14 which is generated via a holder 16 of the device 2. In this exemplary embodiment, the component 4 overlaps the component 6, so that the components 4, 6 are arranged in the manner of a lap joint and are welded to one another in this arrangement.

FIG. 2 shows a first example of the use of a method according to the invention, the component 4 being composed of a carbon fiber-reinforced plastic which has a transition zone 18. The transition zone forms a transition from the carbon fiber-reinforced plastic to a glass fiber-reinforced or nonreinforced plastic in which the transparency of the component 4 to the laser radiation 10 varies spatially, the joining zone 8 being formed along the contact face 20 between the components 4, 6 in the region 22 of higher transparency.

FIG. 3 shows a second example of the use of a method according to the invention, two long fiber-reinforced components 6, 6' being welded to one another by means of a further component 4 transparent to the laser radiation 10, in which a joining zone 8, 8' is formed in each case between one of the long fiber-reinforced components 6, 6' and the further component 4. For this purpose, in this exemplary embodiment, the further component 4 overlaps both the component 6 and the component 6'. The components 6, 6' touch one another at an abutting face 24, so that the components 6, 6' are arranged in the manner of a butt joint with respect to one another and are connected to one another in this arrangement via the component 4.

FIG. 4 shows a third example of the use of a method according to the invention, in which the components 6, 6' are welded together according to the exemplary embodiment shown in FIG. 3, in this example two further components 4, 4' being used which are arranged parallel and opposite to one another, so that the components 6, 6' are arranged between the components 4, 4'. The components 6, 6' are again arranged in the manner of a butt joint with respect to one another and connected to one another via the components 4, 4', the component 4 being welded to the component 6 in a joining zone 8 and to the component 6' in a joining zone 8'.

In a similar way, the component 4' is welded to the component 6 in a joining zone 8'' and to the component 6' in a joining zone 8'''. The two components 4, 4' are transparent to the laser radiation 10 in order to be welded to the components 6, 6'. The welding of the components may take place simultaneously. However, the joining zones 8, 8', 8'', 8''' may also be generated in succession, in that the laser radiation 10 is focused first onto the joining zone 8 and, after the welding of the component 4 to the component 6, the component 4 is welded to the component 6'. The welding of the component 4' to the components 6, 6' thereupon takes place in the same way.

FIG. 5 shows a fourth example of the use of a method according to the invention, in which a component 4 is welded to a component 6, in this exemplary embodiment the ends 26, 26' of the components 4, 6 being chamfered such that the contact face 20 is inclined with respect to the horizontal. The contact face 20 may in this case also be formed in the manner of a staircase. It is also possible, according to the invention, that one of the components 4, 6 has spatially varying transparency.

FIG. 6 shows a fifth example of use, in which the component 6 and the component 6' are arranged in the manner of a butt joint with respect to one another and are connected to one another in this arrangement, a further component 4 transparent to the laser radiation being used for welding the components 6, 6' together.

The ends 26, 26' of the components 6, 6' are in each case chamfered and are arranged in the manner of a butt joint for a V-seam and are connected to one another in this arrangement via the component 4. To weld the components 6, 6' together, the component 4 is of triangular form in cross section and is welded to the component 6 in a joining zone 8 and to the component 6' in a joining zone 8'. The two components 6, 6' are thereby connected to one another, without these being welded directly to one another.

In this exemplary embodiment, the component 4 is composed of a nonreinforced material or of a glass fiber-reinforced material, and the components 6, 6' are composed of a long fiber-reinforced material. A different assignment of the materials may also be selected, however.

FIG. 7 shows a sixth example of the use of a method according to the invention, which is formed similarly to the fifth exemplary embodiment, but with the difference that the "chamfered" ends 26, 26' of the components 6, 6' are designed in the manner of a staircase.

FIG. 8 shows a seventh example of the use of a method according to the invention. In this case, the components 4, 6 are welded to one another in that the end 26 of the component 4 is designed in the manner of a fork into which the end 26' of the component 6 engages in the manner of a form fit. The components 4, 6 are connected to one another by means of two joining zones 8, 8'. According to the invention, it is also possible that the components 4, 6 are connected to one another by means of further joining zones.

FIG. 9 shows an eighth example of the use of a method according to the invention, in which the component 4 is arranged at right angles to the component 4' in the manner of a T-joint. The components 6, 6' are of triangular design in cross section and are arranged on both sides of the component 4 in such a way that the component 6 is welded to the component 4 in a joining zone 8 and to the component 4' in a joining zone 8'. Similarly, the component 6' is welded to the components 4, 4' in each case in a joining zone 8", 8'". The components 4, 4' are thereby connected to one another by means of the components 6, 6'. The components 4, 4' are long fiber-reinforced and the components 6, 6' are composed of a nonreinforced or glass fiber-reinforced material.

FIG. 10 shows a ninth example of the use of a method according to the invention, in which the components 4, 4' are arranged to form a T-joint in the same way as in the eighth exemplary embodiment. In contrast to the eighth example of use, the components 6, 6' are of angled form. The components 6, 6' are welded to the components 4, 4' in the joining zones 8, 8', 8", 8'" in the same way as in the eighth example of use.

FIG. 11 shows a tenth exemplary embodiment of a method according to the invention, in which the components 4, 4' are arranged to form a T-joint in the same way as in the eighth or ninth exemplary embodiment. In contrast to these, however, the components 6, 6' are of rectilinear form in the manner of a fishplate, so that they are connected to the component 4 via their abutting faces 24, 24' and to the component 4' via their surfaces 12, 12'.

To form the joining zones 8, 8', 8", 8'", the laser radiation may be arranged in each case in different angular positions with respect to the component 4 or component 4' or to the component 6 or component 6'. The joining zones 8, 8', 8", 8'" will also have an additive, for example an adhesive. Furthermore, at least one of the joining zones 8, 8', 8", 8'" may also be formed solely by the use of an adhesive, so that differently produced joining zones 8, 8', 8", 8'" are used together to connect the components 4, 4'.

The examples of use illustrated do not constitute an exhaustive listing of the possibilities for the use of a method according to the invention. Thus, said allocation of the types of material to the individual components can be varied. Furthermore, the laser radiation can be introduced from different directions. The weld may be made in one work step, but also in different work steps. Moreover, the method according to the invention may also be combined with other welding methods, so that the joining zones can be produced by means of different methods.

According to the invention, in particular, it is possible to weld two carbon fiber-reinforced components together by means of a glass fiber-reinforced component through the glass fiber-reinforced component, specifically in such a way that the two carbon fiber-reinforced components are also connected intimately to one another in this process. In this case, the invention embraces the recognition that the heat conduction of carbon fibers perpendicularly to the fiber direction is critical for the process.

Furthermore, the invention embraces the recognition that, when two carbon fiber-reinforced components are used at an abutting edge, with a layer of glass fiber-reinforced plastic laid in place, an intimate connection at the abutting edge is made by heat conduction.

Furthermore, the invention embraces the following recognized procedures:
i) the method according to the invention was qualified for joining plastics based on polyamide 6.6 (PA 6.6). The laser-absorbing joining partner used was continuous carbon fiber-reinforced PA 6.6 (CF PA 6.6). The laser-transparent joining partner used is PA 6.6 with short glass fiber-reinforcement of up to 50%. For all the material combinations, tension shear strengths were measured and the weld seam formation was evaluated on the basis of ground cross sections. The method according to the invention in conjunction with PA 6.6 could be carried out successfully both in the contour welding method and in the quasisimultaneous method. Using pyrometer-based process observation, power regulation for homogenizing the formation of the weld seam could be implemented successfully.
ii) The work described under i) was carried out likewise for the matrix material polyphenylenesulfite (PPS). In contrast to PA 6.6, nonreinforced and glass mat-reinforced PPS materials were used here as laser-transparent joining partners.
iii) With the material combinations described under i) and ii), combinations composed of CFPA 6.6-CFPA 6.6 and CF PPS-CF PPS were welded for the first time, using a third laser-transparent joining partner.
iv) Using a laser-transparent joining partner composed of glass mat-reinforced PPS, a direct overlapping connection of CF PPS and CF PPS could be implemented for the first time in such a way that, by heat conduction through one CF PPS component, the latter was connected to a further CF PPS component located under it by means of a welded joint.
v) The joining method according to the invention is suitable particularly for carrying out repairs of composite materials.

Further recognized procedures in connection with the invention are laid down in the publications "Laser transmission welding of thermoplastic composites Fundamental investigations into the influence of the carbon fiber reinforcement and orientation on the weld formation", "Joining Plastics April 2009", p. 247-255, and "Laserstrahlschweißen kohlenstoff-faserverstärkter Kunststoffe Prozesssicheres Fügen ohne Zusatzstoffe" ["Laser beam welding of carbon fiber-reinforced plastics—process reliable joining without additives"], Ingenieurspiegel January 2010, p. 64-66. Both publications mentioned above are hereby incorporated fully into the present application by reference. The features disclosed in the two publications form, together with the features disclosed in the present application, an overall disclosure of the invention. In this case, all disclosed features form in themselves and in any desired combination with one another the subject of the invention, irrespective of their description or illustration and irrespective of the location of the disclosure.

The invention claimed is:
1. A method for joining at least two components, wherein
at least one first component of said at least two components is composed at least partially of thermoplastic material and includes at least one region that is at least partially transparent to laser radiation,
at least one additional component of said at least two components is composed at least partially of thermoplastic material, and at least one of said at least one first component and said at least one additional component is reinforced or coated with long fibers which are at least 1 mm in length, by the steps of:

positioning regions of said at least one first component and said at least one additional component to form at least one joining zone;

introducing laser radiation into said joining zone through said at least one partially transparent region of said at least one first component, wherein said laser radiation passes through said at least one partially transparent region of said at least one first component and is at least partially absorbed by said long fibers so as to generate sufficient heat within said at least one joining zone to at least partially melt said thermoplastic material of said at least one first component and thermoplastic material of said at least one additional component; and forming a weld seam between said thermoplastic material of said at least one first component and said thermoplastic material of said at least one additional component.

2. The method as claimed in claim 1, wherein said at least one additional component includes at least two of said additional components welded to one another by means of said at least one first component.

3. The method as claimed in claim 2, wherein one of said two additional components is constructed and/or the method parameters are selected such that the at least two additional components are connected intimately to one another.

4. The method as claimed in claim 1, wherein said long fibers are arranged at least partially in a matrix which is composed at least partially of a thermoplastic material or contains a thermoplastic material.

5. The method as claimed in claim 4, wherein said thermoplastic material is a thermoplastic elastomer or contains a thermoplastic elastomer.

6. The method as claimed in claim 1, wherein said at least one first components has at least one transition zone, within which transparency to the laser radiation varies spatially, and said at least one joining zone is formed in a region of higher transparency along a contact face between said at least one first components and said at least additional components.

7. The method as claimed in claim 6, wherein said region of higher transparency.

8. The method as claimed in claim 1, wherein the laser radiation is absorbed by at least some of said long fibers which are positioned on at least one of a surface and a location adjacent the surface of at least one of the at least two components.

9. The method as claimed in claim 1, wherein the laser radiation is absorbed on at least one long fiber laser-absorbing layer coating on a surface or at least one layer of long fiber matrix within said thermoplastic material of at least one of the at least two components.

10. The method as claimed claim 1, wherein at least one of said at least two components is reinforced by at least one of carbon fibers and glass fibers.

11. The method as claimed in claim 1, wherein at least one component of said at least two components is nonreinforced or is short fiber-reinforced, wherein said short fibers are less than 1 mm in length.

12. The method as claimed in claim 1, wherein said at least one additional component is carbon fiber-reinforced and said at least one first component that is at least partially transparent to laser radiation is glass fiber-reinforced.

* * * * *

UNITED STATES PATENT AND TRADEMARK OFFICE
CERTIFICATE OF CORRECTION

PATENT NO. : 8,591,693 B2  
APPLICATION NO. : 13/320049  
DATED : November 26, 2013  
INVENTOR(S) : Peter Jaeschke et al.

Page 1 of 1

It is certified that error appears in the above-identified patent and that said Letters Patent is hereby corrected as shown below:

On the title page item (73), Assignee name to read as follows:

LZH Laser Zentrum Hannover e.V.

Signed and Sealed this  
Twenty-second Day of April, 2014

Michelle K. Lee  
*Deputy Director of the United States Patent and Trademark Office*